Oct. 21, 1952 W. A. WELDEN 2,614,723
CLOSURE MEANS FOR PRESSURE COOKERS
Filed June 15, 1946 3 Sheets-Sheet 1
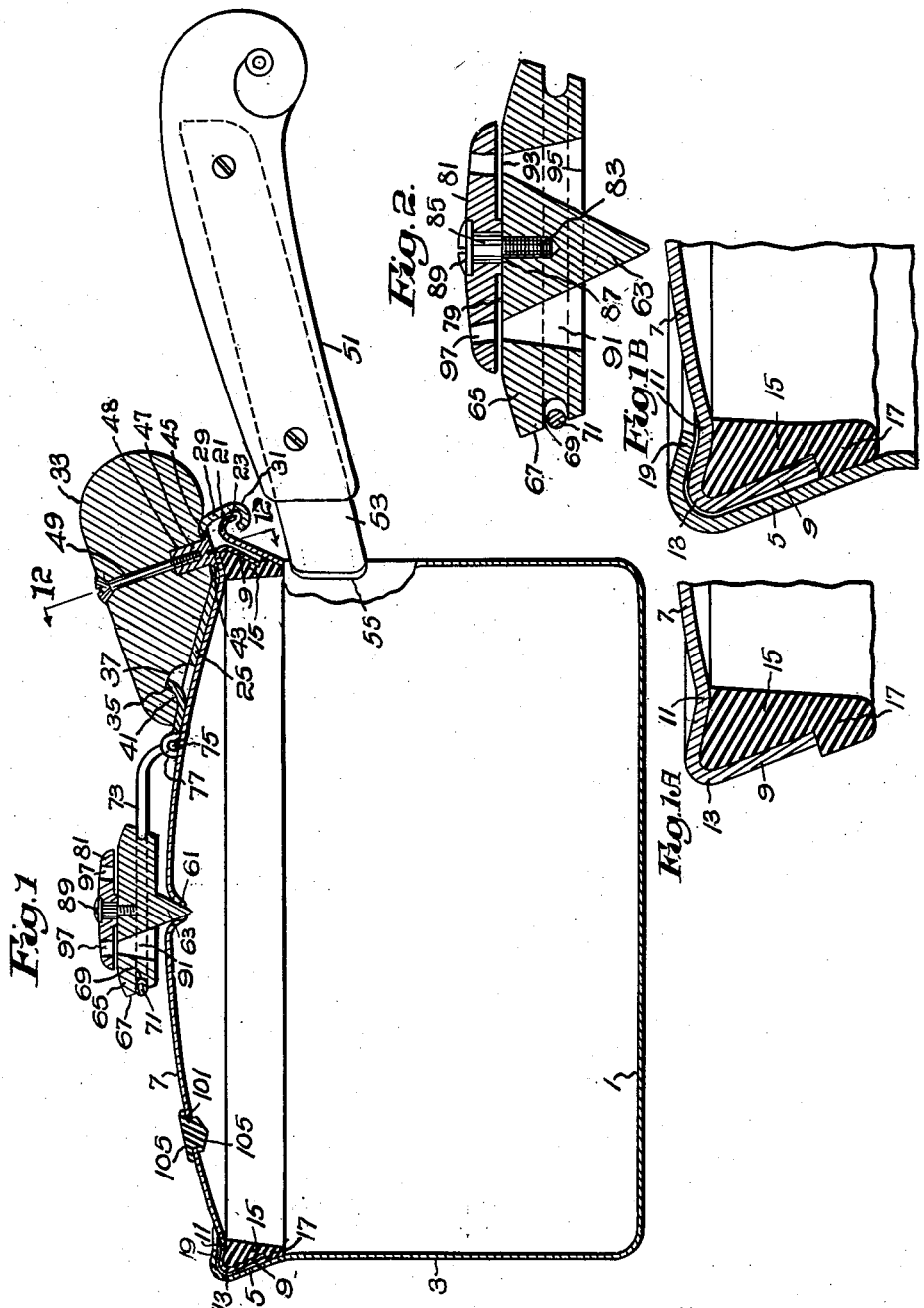
Inventor:
William A. Welden
by Emery Booth Townsend Miller & Weidner
Attys

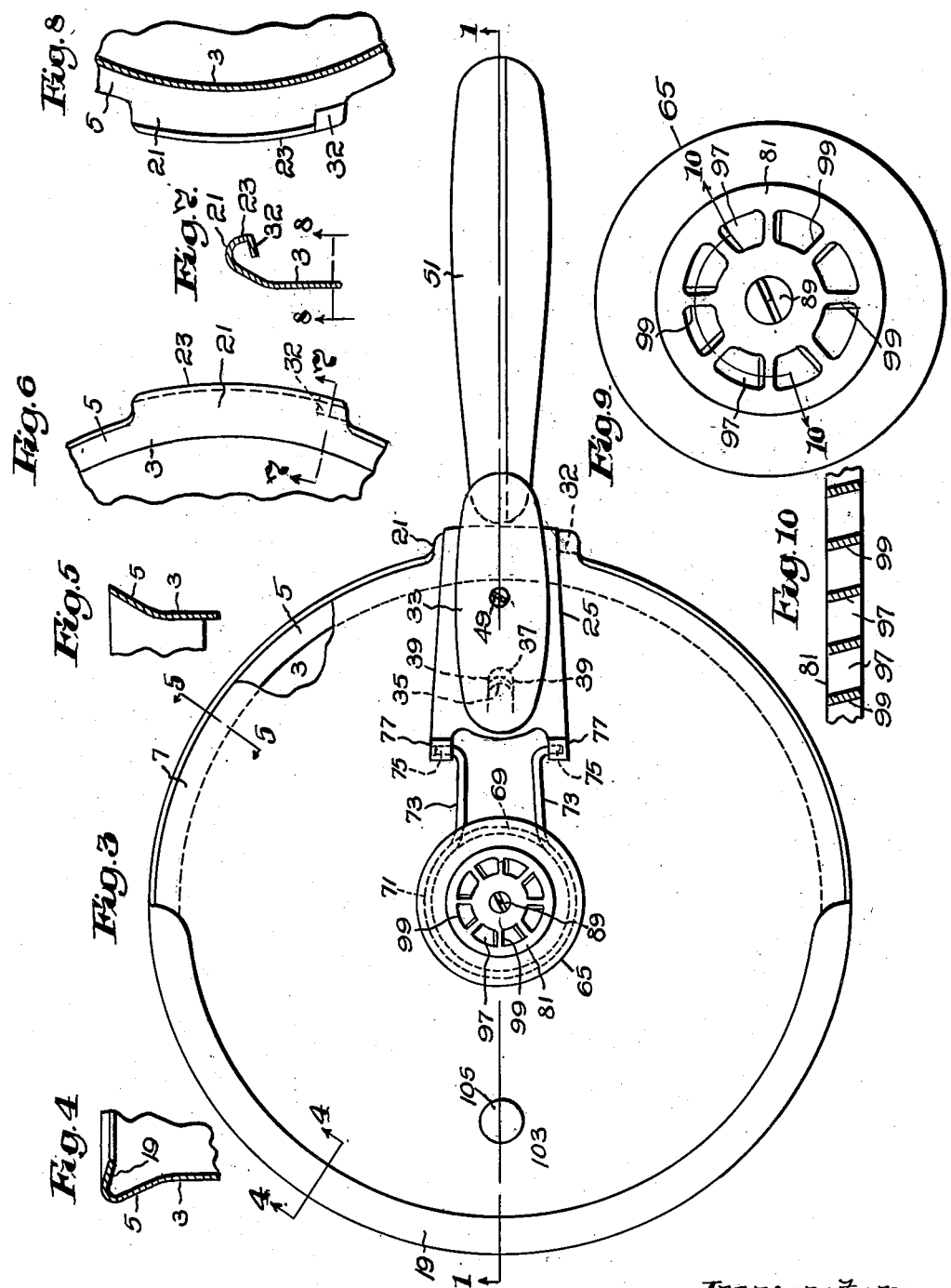

Oct. 21, 1952 W. A. WELDEN 2,614,723
CLOSURE MEANS FOR PRESSURE COOKERS
Filed June 15, 1946 3 Sheets-Sheet 3
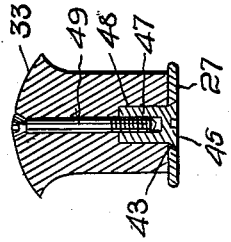
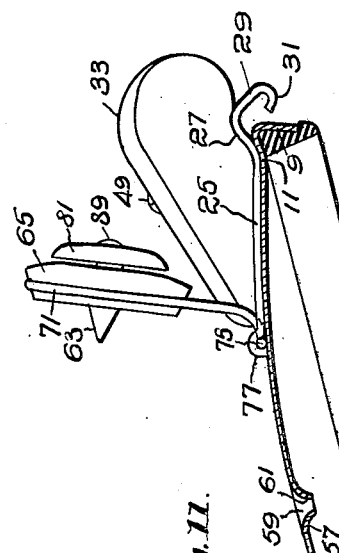
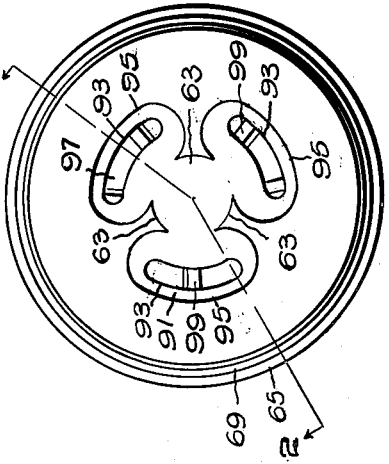
Inventor:
William A. Welden
by Emery Booth Townsend Miller & Weidner
Attys Patented Oct. 21, 1952

2,614,723

UNITED STATES PATENT OFFICE 2,614,723

CLOSURE MEANS FOR PRESSURE COOKERS

William A. Welden, Stamford, Conn., assignor to Revere Copper and Brass Incorporated, Rome, N. Y., a corporation of Maryland Application June 15, 1946, Serial No. 677,043

14 Claims. (Cl. 220—40)

My invention relates to pressure cookers.

The invention has among its objects a pressure cooker or the like with an improved cover and improved attaching and packing means for said cover. Among other objects of the invention is an improved relief valve for a pressure cooker or the like, and improved means for indicating when a desired steam pressure in a cooker or the like has been reached. The above and other objects of the invention, however, will be best understood from the following description when read in the light of the accompanying drawings of a preferred embodiment of the invention selected for illustrative purposes, the scope of the invention being more particularly pointed out in the appended claims.

In the drawings:

Fig. 1 is a vertical section of a pressure cooker on the line 1—1 of Fig. 3, with parts in elevation;

Fig. 1A is a fragmentary section of the pressure cooker cover and gasket on the line 1—1 of Fig. 3, corresponding to the portion of the cover and gasket at the upper left hand side of Fig. 1 on an enlarged scale;

Fig. 1B is a fragmentary section on the line 1—1 of Fig. 3, corresponding to the upper left hand corner of Fig. 1 on an enlarged scale;

Fig. 2 is a section on the line 2—2 of Fig. 13;

Fig. 3 is a plan of the pressure cooker according to Fig. 1;

Figs. 4 and 5 are fragmentary sections on the lines 4—4 and 5—5 of Fig. 3 with the cover omitted;

Fig. 6 is a fragmentary plan view, on an enlarged scale, of the cooker according to Figs. 1 and 3 with the cover omitted;

Fig. 7 is a section on the line 7—7 of Fig. 6;

Fig. 8 is a section on the line 8—8 of Fig. 7;

Fig. 9 is a plan view, on an enlarged scale, of the relief valve and turbine rotor assembly according to Figs. 1 and 2;

Fig. 10 is a development of a section, on the line 10—10 of Fig. 9, of the turbine rotor;

Fig. 11 is a section, corresponding to Fig. 1, illustrating a step in the operation of placing the cover of the pressure cooker on the container portion thereof;

Fig. 12 is a section on the line 12—12 of Fig. 1; and

Fig. 13 is a bottom view, on an enlarged scale, of the relief valve and turbine rotor assembly according to Figs. 1, 2, 9 and 10.

Referring to the drawings, the pressure cooker illustrated comprises a container having a bottom wall 1, and, integral with said wall, cylindrical side walls 3. The container is preferably formed of sheet metal, such as sheet stainless steel, by a deep drawing operation. As shown, the side walls 3 adjacent the brim of the container are formed to present an upwardly and outwardly flaring frusto-conical portion 5.

The cover 7, which also preferably is pressed from sheet metal, is provided with a downwardly and inwardly tapered annular edge flange 9 adapted to be rotatably received by the annular flared portion 5 of the container. As shown, the cover adjacent its flange 9 is formed with a slightly depressed annular portion indicated at 11, this portion being connected to the flange by a curved annular corner portion 13. For purposes hereinafter described these two flared portions are so designed that, when the cover is in place on the container coaxially thereof, there is no lateral surface to surface contact between those portions. To this end, and as best illustrated in Fig. 1B, a slight lateral clearance is provided between the upper portion of the flange and the adjacent surface of the flared portion 5 of the container, the flange to compensate for any possible spring or bending thereof preferably having a slightly greater taper than the portion 5 so that a somewhat wider clearance is provided between the flared portions adjacent the lower edge of the flange.

As shown, the cover carries a gasket 15 in the form of a continuous ring, or split ring with abutting ends, of yieldable compressible material, for example, vulcanized natural or synthetic rubber, suitably plasticized Du Pont nylon, or the like. The gasket illustrated is of wedge-shaped cross-section, its upper edge or base and its outer annular surface being shaped to fit in the recess between interior sides of the cover body, cover edge flange 9 and rounded corner 13, when sprung into or otherwise inserted in said recess. The gasket extends well below the lower edge of the flange 9 to provide a portion 17 (hereinafter sometimes termed the "apex portion" of the gasket) which extends radially outward beyond the outer surface of said flange so as to adapt the gasket rotatably to seat on the lower part of the interior surface of the flaring annular portion 5 of the container. It will be observed that the construction described is such that the gasket is removably secured to the cover, and that the pressure in the cooker is operative to force the body of the gasket against the adjacent surfaces of the cover, and the apex portion of the gasket against the portion 5 of the container, so as to seal the joint between the cover and the container. Also it will be observed that the construction is such as to permit the gasket to yield and relieve any vacuum tended to be created in the cooker if the contents of the latter are allowed to cool while the cover is in position and the pressure relief valve, hereinafter described, is not opened by the operator. Such vacuum, it will be understood, if permitted to be formed would cause explosion of vegetables, such as peas, having thin impervious skins.

Because of the clearance between the cover flange 9 and the flared portion 5 of the container, and the apex portion 17 of the yieldable compressible gasket projecting radially outward beyond the outer surface of the flange, the weight of the cover and parts carried by it causes the apex portion of the gasket about its entire periphery firmly to seat on the portion 5 when the cover is initially placed on the container. This permits steam pressure to build up in the cooker when its contents are heated, which otherwise would not occur if the gasket were not initially firmly seated about its entire periphery on the container portion 5. Were the parts so designed that the flange 9 would seat on the portion 5 of the container when the cover is initially applied, the weight of the cover would be taken off the gasket with reliance only on the radial outward resiliency of the apex portion of the gasket to cause seating of the latter on the portion 5, and, under such conditions, no assurance could be had that the gasket would seat on said portion about its entire periphery. Further, it is difficult to make the cover flange and flared portion 5 of the container truly circular, or to maintain them as such when the cooker is put into use, with the result that if the lower portion of the gasket did not project radially beyond the outer surface of the cover flange, to prevent surface to surface contact of that flange with the container portion 5, no assurance would be had that the metal to metal contact would continuously extend about the entire periphery of the flange, and therefore no assurance that when the cover is initially applied the gasket about its entire periphery would continuously contact with the container.

As illustrated, the container at its brim is provided with an inwardly projecting lip 19, which lip extends for about 180° of the angular extent of the flared portion 5 of the container, as clearly shown in Fig. 3. This lip is so shaped as to fit over and contact with the edge portion of the cover when the interior of the cooker is under pressure. Diametrically opposite the lip 19 the container at its brim is provided with an outwardly projecting lip 21, the outer portion of which lip is downturned, as indicated at 23, so that the lip in cross-section is hook-shaped as clearly shown in Figs. 1 and 11. The outwardly projecting lip 21, as clearly shown in Figs. 3 and 6, extends for a much less angular extent of the cylindrical walls of the container than does the inwardly projecting lip 19.

As shown, the cover 7 at its upper side carries a plate 25 preferably spot welded thereto, the plate conforming to the upper surface of the body of the cover and having a portion 27 which projects outward beyond the edge flange 9 of the cover. At the outer end of the portion 27 the plate 25 is bent downward, as indicated at 29, this downturned portion at its lower edge being bent upward and inward to form a hook 31 adapted to engage with the downturned portion 23 of the lip 21.

The cover of the cooker may be placed on and secured to the container by tilting the cover and inserting a portion of its edge beneath the lip 19, as shown in Fig. 11, whereupon the cover may be rotated relative to the container to bring the hook 31 on the cover wholly between adjacent ends of the lips 19 and 21 on the container, and, as part of the same movement, be brought into a horizontal position to cause the apex portion 17 of the gasket 15 to seat on the inner surface of the portion 5 of the container. The cover so positioned may then be axially rotated on the container to cause the hook 31 on the cover to move under the lip 21. The cover may be removed by movements the reverse of those described when the pressure in the cooker is relieved. Preferably, a suitable stop is provided for limiting the rotative movement of the cover on the container for engaging the hook 31 with the lip 21, 23. As shown, such a stop is formed by providing one end of the lower edge of the downturned portion 23 of the lip 21 with an inturned projection 32 (Figs. 6, 7 and 8), which projection is so positioned as to lie in the path of movement of the hook 31 when the applied cover is rotated to cause said hook to move under the lip.

As best shown in Figs. 1 and 1B, the parts preferably are so designed as to present, when the cover is initially applied, a slight clearance between the cover and the container lip 19, and approximately the same degree of clearance between the lower edge of the container lip 23 and the facing surface of the hook 31. As the pressure builds up the cover rises relative to the container to take up these clearances, the gasket moving upward with the cover while maintaining the seal. Providing these clearances insures that the cover, when initially applied to the container, will not be forced toward the latter at localized points by faulty engagement of the lip 19 with the cover, or faulty engagement of the lip 23 with the hook 31, either of which, if it occurred, might cause the gasket to fail to seat continuously about its entire periphery on the container when the cover is initially applied. Such faulty engagement of the parts would be liable to occur, if the mentioned clearances were not provided, because of discrepancies in manufacture, or bending or denting of the parts when in use.

For rotating the cover the same is conveniently provided with a handle 33 attached to the plate 25. As shown, the plate is struck up to form an upwardly extending projection or lug 35 inclined toward the edge of the cover, the handle being provided on its side adjacent the plate 25 with a recess 37 receiving this projection, the projection fitting the opposed lateral walls 39 (Fig. 3) of the recess and its rear wall 41 (Fig. 1). As further illustrated, the portion 27 of the plate 25 is perforated and countersunk, as indicated at 43 (Figs. 1 and 12) for receiving the flat frusto-conical head 45 of a nut having a shank portion 47 received in and fitting a recess 48 in the adjacent side of the handle 33. Screw-threadedly received by this nut is a screw 49 extending through the handle from its upper edge, so that the handle is secured to the portion 27 of the plate 25 as well as secured to the projection 35.

As shown, the container portion of the cover is provided with a handle 51 having a metallic shank 53 provided with ears 55 preferably spot welded to the side walls 3 of the container.

The cover at its center portion is shown as perforated and struck up to form downwardly converging annular walls 57 surrounding an opening 59, the lower portion of said walls interiorly thereof forming a substantially frusto-conical valve seat 61. Cooperating with this valve seat is a conical valve 63 which, as illustrated, is formed as part of a metallic disk-like weight 65, from the under surface of which latter the valve projects downwardly axially thereof. The cross-sectional area of the opening in the cover at the valve seat is such with relation to the downward gravitational effect of the weight that the latter will lift when a predetermined pressure is established in the cooker say, for example, 15 pounds pressure per square inch.

As illustrated, the disk-like weight 65 is provided with downwardly converging frusto-conical lateral walls 67 in which is formed a circumferential open groove 69. Received in this groove is the arcuate portion 71 of a bail-like member having the arms 73 integral with said arcuate portion, the latter, as clearly illustrated in Fig. 3, having a greater angular extent than 180° so that when the arcuate portion is received in the groove 69 the weight will be secured to the bail-like member. Preferably, the bail-like member is formed of a bent stiff wire for making the arcuate portion of said member transversely resilient, so that said arcuate portion will snap into the groove 69 when the under side of the weight is presented to said arcuate portion and pressed toward it, and will snap from the groove when the weight is forced away from it. The arms 73 of the bail-like member, as shown, terminate in outwardly bent trunnion portions 75 (Fig. 3) which are received in what operatively amounts to spaced perforated ears formed by the bent portions 77 of the plate 25, which latter portions when assembled with the cover 7 form openings between them and the upper side of said cover. The arcuate portion 71 of the bail-like member has sufficient resiliency to enable the arms to be pressed inwardly toward each other far enough to insert the trunnion portions of the arms into the openings beneath the portions 77 of the plate 25 prior to assembling the weight with the bail-like member. Preferably the arcuate portion 71 of the bail-like member fits the groove 69 of the weight 65 rather loosely so as to insure seating of the valve 63 on the valve seat 61, and to permit axial rotation of the valve so that given portions thereof will not always seat on the same given portions of the valve seat. It will be understood that different weights 65 may be substituted to cause the valve to open at different desired pressures.

As illustrated, carried by the weight 65 in closely adjacent relation to the flat upper side 79 thereof is a flat disk-like rotor 81, preferably formed of light weight material as, for example, molded Du Pont nylon. As shown (see Fig. 2), screw-threadedly received in the upper side of the weight is a screw 83 having the enlarged diameter portion 85 providing a shoulder 87 bearing against the upper surface of the weight. The rotor 81 is rotatably mounted on this enlarged diameter portion, and is retained thereon by the further enlarged diameter head 89 of the screw.

As best shown in Figs. 2 and 13, the weight 65 is formed with passages 91 which collectively surround the valve 63 in concentric relation thereto, the inner sides of those passages being prolongations of the conical surface of said valve. These passages, which are flared outwardly and downwardly on all sides, open on the upper side 79 of the weight through arcuate ports 93 and open on the lower surface of the weight through arcuate ports 95. In alignment with the ports 93 the rotor 81 is formed with a series of through passages 97 separated from each other by partitions 99 which, as clearly shown by Figs. 9 and 10, are inclined in such way as to form vanes for causing steam jets which pass through the openings 97 to tend to spin the rotor.

When the pressure in the cooker reaches a predetermined value as, for example, 15 pounds the valve 63 will slightly open to permit escape of steam from the cooker. This steam will discharge through the opening between the conical surfaces of the valve and valve seat in the form of an inverted conical sheet and will be directed into the passages 91 of the weight. Because of the upwardly converging walls of these passages this steam will be discharged through the arcuate ports 93 at the upper side of the weight in the form of jets which will impinge against the inclined vanes 99 of the rotor and set the latter in motion, thus indicating to the operator that the desired predetermined pressure has been reached, which is otherwise difficult to determine because the slight amount of steam escaping when the valve opens is superheated and discharges into the hot atmosphere above the stove or cooker and thus in many cases is almost invisible. Because of the light weight of the rotor and the construction described the rotor spins instantly upon the valve slightly opening. This spinning indicates to the operator that the gas flame or other source of heat for the cooker should be diminished to the extent that will just keep the rotor spinning at a moderate speed if it is desired to continue cooking at the predetermined pressure, or diminished to such an extent that the rotor does not spin at all in cases where it is desired to perform the cooking operation in such way that the food is heated until the predetermined pressure is reached and is then cooked at a temperature somewhat less than that which corresponds to the predetermined pressure.

To avoid the possibility of the creation of a dangerously high pressure in the cooker should the valve controlled cover opening 59 become clogged with food, the cover may be provided with emergency pressure relief means. As shown, for this purpose the cover is formed with an opening 101, into which opening is sprung a plug-like member formed of yieldable material, such as rubber, this member comprising a shank portion 103 received by the opening and, integrally carried by opposite ends of said shank portion, heads 105 adapted to bear against the upper and under surfaces of the cover. The inner head 105 is adapted to be forced against the under surface of the cover by the pressure of the steam in the cooker so as normally to render the opening 101 steam tight, but upon the pressure reaching too high a value that head will shear off or collapse and the plug will be ejected from the opening.

It will be understood that within the scope of the appended claims wide deviations may be made from the form of the invention herein described without departing from the spirit of the invention.

I claim:

1. A pressure cooker having, in combination, a container comprising side walls having a portion adjacent the container brim presenting an interior upwardly and outwardly flaring surface angularly coextensive with said walls, a cover having a portion presenting an exterior downwardly and inwardly flaring endless surface adapted to be laterally loosely received by said container portion, and a ring-like yieldable gasket carried by said cover presenting a portion adapted to seat on said interior surface below said exterior surface when said cover is placed on said container to cause said cover portion to be so received, and means for detachably securing the cover to said container.

2. A pressure cooker having, in combination, a container comprising side walls having a portion adjacent the container brim presenting an interior upwardly and outwardly flaring surface angularly coextensive with said walls; a cover having a portion presenting exterior and interior downwardly and inwardly flaring surfaces adjacent its peripheral edge angularly coextensive with said edge, which cover portion is adapted to be laterally loosely received by said container portion; a ring-like yieldable gasket carried by said cover, which gasket has a portion received in the recess between the under side of the cover body and said interior flaring surface of said cover portion for securing said gasket to said cover, the gasket also having a depending edge portion adapted to seat on said interior flaring surface of said container below said cover portion when said cover is placed on said container to cause said cover portion to be so received; and means for detachably securing said cover to said container.

3. A pressure cooker having, in combination, a container having side walls formed to present, adjacent the container brim a portion presenting an interior upwardly and outwardly flaring surface angularly coextensive with said brim; a cover provided with a downwardly and inwardly flaring endless edge flange adapted to be laterally loosely received by said container portion at the upper part of said outwardly flaring surface, a ring-like yieldable gasket carried by said cover, said gasket having a portion received in the recess between the under side of the cover body and said edge flange for securing said gasket to said cover, the gasket having a depending edge portion adapted to seat on said flaring surface of said container below said edge flange when the latter is so received, and means for detachably securing said cover to said container.

4. A pressure cooker according to claim 3 in which the edge flange of the cover presents parallel inwardly and downwardly flaring peripheral endless surfaces, and the gasket is of wedge-shaped cross-section, the base of the gasket being adapted to seat against the under side of the cover body, and its outer side being adapted to seat against the interior side of said flange with a portion of said outer side of the gasket extending below the lower edge of said flange and radially outward of said flange for seating on the upwardly and outwardly flaring container surface when said flange is laterally loosely received by the container portion presenting such container surface.

5. A pressure cooker having, in combination, a container comprising side walls having a portion adjacent the container brim presenting an interior upwardly and outwardly flaring surface angularly coextensive with said walls, a cover having a portion presenting an exterior downwardly and inwardly flaring endless surface, which cover portion is adapted to be received by said container portion, means for securing the cover to the container providing for lost vertical motion of the cover relative to the container when the cover is so received and the cooker is not under pressure, and a gasket carried by said cover, which gasket is adapted slidably to contact with said outwardly flaring surface when said cover is so received whereby to establish an initial seal between the cover and container to permit pressure to build up in the cooker and permit such lost motion to be taken up without interrupting such seal as the pressure in the cooker builds up.

6. A pressure cooker having, in combination, a container having side walls presenting a portion having an upwardly and outwardly flaring interior surface adjacent the container brim, means forming an inwardly projecting lip on said container above said surface for part of the angular extent of said surface, means forming an outwardly projecting lip on said container for another part of the angular extent of said surface, a cover presenting a portion having an exterior downwardly and inwardly flaring surface, which cover portion is adapted to be removably received by said container portion when an edge portion of the cover is inserted beneath said inwardly projecting lip, and securing means carried by the cover for cooperation with said outwardly projecting lip when the cover is so received.

7. A pressure cooker having, in combination, a container presenting an annular cover receiving portion adjacent the container brim, means forming an inwardly projecting lip on said container above said portion for part of the angular extent of the latter, means forming an outwardly projecting lip on said container for another part of the angular extent of said portion, a cover having a portion adapted to be rotatably received within said container portion when an edge portion of the cover is inserted beneath said inwardly projecting lip, and securing means on the cover adapted to move into cooperation with said outwardly projecting lip upon rotation of the cover when so received.

8. A pressure cooker according to claim 7 in which the securing means on the cover is in the form of an outwardly projecting lip adapted to be moved under the outwardly projecting lip on the container by rotation of the cover relative to the latter.

9. A pressure cooker according to claim 7 in which the inwardly projecting lip on the container has its ends substantially diametrically opposite each other.

10. A pressure cooker according to claim 7 in which the securing means on the cover is in the form of an outwardly projecting lip adapted to be moved under the outwardly projecting lip on the container by rotation of the cover relative to the latter, the inwardly projecting lip on the container having its ends substantially diametrically opposite each other.

11. A pressure cooker having, in combination, a container comprising side walls presenting a cover receiving portion having an interior upwardly and outwardly flaring annular interior surface adjacent the container brim, means forming an inwardly projecting lip carried by said side walls above said surface for part of the angular extent of the latter, means forming an outwardly projecting lip carried by said side walls for another part of the angular extent of said surface, a cover having a depending edge flange presenting an exterior downwardly and inwardly flaring annular surface, which flange is adapted to be rotatably received by said container portion when the edge portion of the cover is inserted beneath said inwardly projecting lip, and securing means on said cover adapted to move into cooperation with said outwardly projecting lip upon rotation of said cover when so received.

12. A pressure cooker according to claim 11 in which the securing means on the cover is in the form of an outwardly projecting lip adapted to be moved under the outwardly projecting lip on the container by rotation of the cover relative to the latter.

13. A pressure cooker according to claim 11 in which the inwardly projecting lip on the container has its ends substantially diametrically opposite each other.

14. A pressure cooker according to claim 11 in which the securing means on the cover is in the form of an outwardly projecting lip adapted to be moved under the outwardly projecting lip on the container by rotation of the cover relative to the latter, the inwardly projecting lip on the container having its ends substantially diametrically opposite each other.

WILLIAM A. WELDEN.

REFERENCES CITED

The following references are of record in the file of this patent:

UNITED STATES PATENTS

| Number | Name | Date |
| --- | --- | --- |
| 2,198,125 | Nelson | Apr. 23, 1940 |
| 2,218,188 | Wittenberg | Oct. 15, 1940 |
| 2,297,378 | Wittenberg | Sept. 29, 1942 |
| 2,403,778 | Zdanaitis | July 9, 1946 |
| 2,436,566 | Goldberg | Feb. 24, 1948 |

FOREIGN PATENTS

| Number | Country | Date |
| --- | --- | --- |
| 12,969 | Austria | Aug. 10, 1903 |
| 266,049 | Italy | July 17, 1929 |
| 366,697 | Great Britain | Feb. 11, 1932 |